3,097,065
PROCESS FOR RECOVERY OF AMMONIA FROM COKE OVEN GAS AS AMMONIUM CHLORIDE AND AMMONIUM SULFATE
Herbert A. Gollmar, Bethel Park, Pa., assignor to Koppers Company, Inc., a corporation of Delaware
No Drawing. Filed May 17, 1957, Ser. No. 659,761
3 Claims. (Cl. 23—100)

This invention relates to a process for the recovery of ammonia from coke oven gas.

The gas which results from the destructive distillation of coal usually contains ammonia to the extent of 1–3 percent by volume. If this gas is to be used for household heating, the ammonia must be removed since the ammonia corrodes the copper meters and fittings and forms noxious fumes (oxides of nitrogen) upon burning; and if this gas is to be released to air, the ammonia must be removed since the ammonia presents a problem of atmospheric pollution. Conventionally, the ammonia removal involves scrubbing the gas with a solution of sulfuric acid thereby producing twelve to thirty pounds of ammonium sulfate per ton of coal. One type of apparatus for carrying out this operation is described in U.S. Patent No. 2,595,104.

In the removal of the ammonia from the gas by the foregoing process, the ammonia-bearing gas in intimately contacted with a solution that contains 1 to 8 percent free sulfuric acid. The absorption of ammonia from the gas by this solution neutralizes free sulfuric acid to form ammonium sulfate in solution. The concentration of ammonium sulfate increases until the solution becomes saturated; and the absorption of more ammonia thereafter causes ammonium sulfate to crystallize out of the solution.

Normally the pH value of the solution in the foregoing process is maintained below 3, as it has been necessary heretofore to maintain some reserve free sulfuric acid in the solution, so that irregularities in ammonia content of the gas and irregularities in the rate at which fresh sulfuric acid is added will not result in complete absence of sulfuric acid. Should such a condition occur, the pH value of the solution would increase rapidly and ammonia would no longer be absorbed. It has been found that the pH value of the absorbing solution must be maintained below 7.5 for efficient absorption when sulfuric acid is used; or upon neutralization of the last traces of the sulfuric acid by ammonia, further absorption of ammonia causes a rapid increase in the pH from 3.0 or less when the acid is present to more than 8.0. Consequently, it is necessary to maintain a small reserve of free sulfuric acid; and this, incidentally, maintains the solution at a pH value of 3.0 or lower.

A serious disadvantage of the foregoing process is that the equipment containing this acidic solution is subject to intense corrosive action. The equipment, therefore, has been made of stainless steel, has been lead-lined, or has been made of other expensive corrosion-resistant alloys. Another disadvantage is that the high acid value also captures the pyridine of the gas as a salt of the acid. Since the sulfate of pyridine is extremely deliquescent, changes in ambient humidity conditions tend to cause an undesirable caking of the ammonium product.

An object of the present invention, therefore, is to provide for the recovery of the ammonia from coke oven gas as a salt of a strong inorganic acid by a novel process wherein the equipment used is not exposed to intense corrosion.

Another object of the invention is to provide for the recovery of the ammonia constituent of coke oven gas as a salt by a novel process wherein the gas is contacted with a solution which can have a high pH value without loss of ammonia.

Another object of the invention is to provide for the recovery of the ammonia from coke oven gas by a novel process wherein the gas is contacted with a solution which is buffered to a predetermined pH value.

Another object of the invention is to provide a novel process for the recovery of ammonia from coke oven gas as crystals of ammonium sulfate that are substantially free of pyridine salts.

I have found that the above-mentioned objects can be attained by my invention without the disadvantages of the known processes. In general, my novel process involves the use of a buffer mixture for the recovery of ammonia from coke oven gas as a salt of an inorganic acid. As is well known, buffer mixtures have the property of retaining a remarkably constant pH upon dilution and also have the property of exhibiting a remarkably slow change in pH when strong acids or alkalies are added. This action of a buffer mixture is in contrast to the behavior of a pure acid whose pH remains very low until the acid is almost completely neutralized with an alkali and whose pH thereafter increases rapidly to a high value as the last trace of acid is neutralized.

In accordance with the present invention, the ammonia is absorbed from the coke oven gas in a buffer mixture having strong acid ions, such as chloride and sulfate, and weak acid ions such as hydrophosphate ions, and as the mixture is brought in contact with the gas so that the hydrophosphate ions absorb the ammonia from the gas, fresh free strong acid is added to the solution in stoichiometric amount and the pH value of the solution is maintained just low enough for the substantially complete removal of ammonia from the gas. The ammonium salt of the strong acid such as chloride and sulfate, and the ammonium phosphate produced have considerably different solubilities; the solution soon becomes supersaturated with the ammonium salt of the strong acid and the latter salt crystallizes from the solution. The content of ammonium phosphate, however, is maintained low enough so that ammonium phosphate does not crystallize out with the ammonium salt of the strong acid. Thus, the loss if phosphoric acid from the solution is negligible.

The absorption of ammonia by the hydrophosphates ions in accordance with the present invention can be illustrated by the use of sulfuric acid as the strong acid and expressed by the equation:

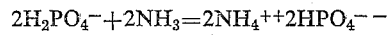
$$2H_2PO_4^- + 2NH_3 = 2NH_4^+ + 2HPO_4^{--}$$

The addition of sulfuric acid converts the $HPO_4^{--}$ ions back to $H_2PO_4^-$ ions

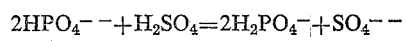
$$2HPO_4^{--} + H_2SO_4 = 2H_2PO_4^- + SO_4^{--}$$

During the above cycle of reactions, the pH is governed by the relative proportions of $HPO_4^{--}$ and $H_2PO_4^-$ ions. At no time is there a low pH that would result from the presence of more sulfuric acid than can react with the phosphate ions.

In order to describe my invention more fully, the following examples are given. It is to be understood, however that the examples are for the purpose of illustration and not limitation.

Coke oven gas containing 2–3 percent of ammonia by volume as a constituent is passed into a bath of liquid in a saturator which may be of the type described in the aforementioned U.S. Patent No. 2,595,104. The solution of the bath has a temperature of between 35 and 70° C., and is saturated as to its content of ammonium sulfate with free ammonium sulfate crystals therein, and is unsaturated as to its content of ammonium phosphate (containing about 10 percent monoammonium phosphate and about 5 percent diammonium phosphate). Free sulfuric acid is added to the solution in substantially stoichiometric proportions to the ammonia taken from the gas to maintain the bath at a pH value of 6–7. The solution becomes supersaturated with respect to the content of ammonium sulfate and the ammonium sulfate crystallizes out. The only losses of phosphates from the solution are in the liquor which is not completely washed from the ammonium sulfate crystals formed and removed from the bath and in any liquid entrained and removed by the gas. Thus, the consumption of phosphoric acid is nil.

The novel process of the present invention may also be used to absorb ammonia from steam vapors. Thus, the novel process is particularly useful for making ammonium sulfate by the so-called "indirect process" where the ammonia is washed out of the coke-oven gas with water, and the ammonia is steam-distilled out of the water with the vapors passing through a saturator to produce ammonium sulfate. In this "indirect process" the vapors comprised of steam and about 5 to 25 percent ammonia vapor are passed through a saturator that is saturated with ammonium sulfate and which also contains about 10 percent monoammonium phosphate and 5 percent diammonium phosphate. The advantages of the use of the invention with the "indirect process" is even greater because the saturators, when used with the "indirect process," normally operate at their boiling point; and at this high temperature, the sulfuric acid-bearing liquor is extremely corrosive.

The novel process of the present invention may also be used in the production of other ammonium salts, such as ammonium chloride. Free hydrochloric acid, for example, is so extremely corrosive that it is not practical to use stainless steel or lead-lined saturators. The novel process of the present invention, however, can produce ammonium chloride, and other ammonium salts in relatively inexpensive equipment because the free acid content is kept nil and the pH value high. In the production of ammonium chloride from coke oven gas, the coke oven gas is brought into intimate contact with an ammonium hydrophosphate solution as in the case of the production of ammonium sulfate above, except that hydrochloric acid is added in stoichiometric amounts to form ammonium chloride. The maximum suggested quantity of phosphate to be used at various temperatures of solution in the saturator are as follows:

| Reaction temperatures, °C.— | Moles of phosphate/liter of water |
|---|---|
| 30 | 1.4 |
| 50 | 3.0 |
| 70 | 5.0 |

Advantageously, two-thirds of the above quantity of phosphate may be used to insure that ammonium phosphate will not precipitate with the ammonium chloride. As a practical matter, the phosphate concentrtaion is adjusted in view of the consideration that the higher the concentration of phosphate, the greater is the possibility of ammonium phosphate crystallizing out, and yet the lower the phosphate concentration, the closer the process must be controlled.

The foregoing illustrates the practice of the invention which, however, is not to be limited thereby but is to be construed as broadly as permissible in view of the prior art and limited solely by the appended claims.

What is claimed:

1. A process for the recovery of ammonia from coke oven gas as ammonium sulfate which comprises contacting said gas with a solution saturated as to its content of ammonium sulfate and containing 10–15 percent of ammonium phosphate, and adding free sulfuric acid to said solution to maintain an acid value just low enough to remove the ammonia from said gas whereupon the solution becomes supersaturated with ammonium sulfate as ammonia is absorbed from said gas and the ammonium sulfate crystallizes out of solution.

2. A process for the recovery of ammonia from coke oven gas as ammonium sulfate which comprises contacting said gas with a solution which is saturated as to its content of ammonium sulfate, contains 10–15 percent ammonium phosphate, and sulfuric acid so that the pH is maintained at a value of 6–7.

3. A process for the recovery of ammonia from coke oven gas as ammonium chloride which comprises contacting said gas with a solution saturated as to its content of ammonium chloride, containing 10–15 percent of ammonium phosphate, and maintained at a pH value slightly lower than 7.5.

References Cited in the file of this patent

UNITED STATES PATENTS

| 1,957,267 | Hansen | May 1, 1934 |
| 2,102,107 | Berkhoff | Dec. 14, 1937 |
| 2,108,783 | Smith | Feb. 15, 1938 |
| 2,383,171 | Tiddy | Aug. 21, 1945 |
| 2,595,104 | Schulte | Apr. 29, 1952 |

OTHER REFERENCES

Britton: "Hydrogen Ions," D. Van Nostrand Company, Inc., New York, N.Y., 1929, pages 132 and 133.